United States Patent
O'Donnell

[19]

[11] Patent Number: 6,091,023
[45] Date of Patent: Jul. 18, 2000

[54] ENCLOSURE FOR INTERFACING ELECTRICAL AND CONTROL OR COMMUNICATION DEVICES

[76] Inventor: Patrick O'Donnell, 1905 Shakespeare Street, Victoria, British Columbia, Canada, V8R 4E7

[21] Appl. No.: 09/046,370

[22] Filed: Mar. 23, 1998

[30] Foreign Application Priority Data

Jan. 21, 1998 [CA] Canada ................................. 2227659

[51] Int. Cl.⁷ ................................................ H01H 9/02
[52] U.S. Cl. .......................................... 174/57; 220/3.92
[58] Field of Search ................................. 174/50, 53, 57; 220/3.2, 3.3, 3.7, 3.92, 3.94, 4.02

[56] References Cited

U.S. PATENT DOCUMENTS

| | | | |
|---|---|---|---|
| 1,437,324 | 11/1922 | Tashjian . | |
| 1,829,648 | 10/1931 | Haering . | |
| 3,082,290 | 3/1963 | Ohmit . | |
| 3,146,298 | 8/1964 | Ceglia . | |
| 3,365,535 | 1/1968 | Wilk | 174/50 |
| 3,371,149 | 2/1968 | Maxted | 174/53 |
| 3,587,906 | 6/1971 | Pepe | 174/53 X |
| 3,622,029 | 11/1971 | Ware | 174/57 X |
| 3,690,501 | 9/1972 | Ware | 174/57 X |
| 3,701,837 | 10/1972 | Fork . | |
| 4,323,723 | 4/1982 | Fork et al. . | |
| 4,433,204 | 2/1984 | Wuertz | 174/53 X |
| 5,257,487 | 11/1993 | Bantz et al. . | |
| 5,354,953 | 10/1994 | Nattel et al. . | |
| 5,378,854 | 1/1995 | Hoover | 174/53 |
| 5,486,650 | 1/1996 | Yetter . | |
| 5,574,256 | 11/1996 | Cottone . | |
| 5,594,207 | 1/1997 | Fabian et al. . | |
| 5,596,174 | 1/1997 | Sapienza | 174/57 |
| 5,598,998 | 2/1997 | Lynn . | |
| 5,655,837 | 8/1997 | Ridley et al. | 174/50 X |
| 5,853,098 | 12/1998 | Elder | 220/3.7 |

OTHER PUBLICATIONS

*Product Handbook*, Commander Electrical Materials Division of Thomas & Betts Ltd., 1995, pp. 44–45.

*Primary Examiner*—Dean A. Reichard
*Attorney, Agent, or Firm*—Barrigar & Moss

[57] ABSTRACT

A combined enclosure for an industry standard electrical device, such as a switch or power receptacle, and a control device for controlling the electrical device, the control device having both controlled connectors and controlling connectors. The combined enclosure comprises an electrical device enclosure, a control components enclosure, and a dividing/mounting plate. The electrical device enclosure has an opening in the bottom defining two side ledges, and the top has a first mounting element adjacent to the front opening for mounting the electrical device in the electrical device enclosure. The control components enclosure has a top opening with side walls bent over to form flanges along sides of the top opening and fits through the opening in the bottom of the electrical device enclosure so as to hang by the flanges from the side ledges. The plate completes the electrical device enclosure and provides a second electrical device mounting element so that the electrical device may not be mounted in the combined enclosure unless the plate is installed. An aperture in the plate is provided for mounting the control device to the underside of the plate so that the controlled connectors are accessible from the upper side of the plate and the controlling connectors are accessible from the underside of the plate.

8 Claims, 8 Drawing Sheets

ENCLOSURE FOR INTERFACING ELECTRICAL AND CONTROL OR COMMUNICATION DEVICES

FIELD OF THE INVENTION

This invention relates to the field of enclosures for electrical and control devices. More particularly, the present invention relates to a combined enclosure for both an electrical device, such as a switch or a receptacle, and a control device, such as a relay, for controlling the electrical device, the enclosure providing a barrier between high and low voltage wiring, such that the electrical device cannot be properly mounted in the enclosure unless the barrier is in place.

BACKGROUND OF THE INVENTION

In recent years there has been an increasing demand for apparatus for controlling electrical devices such as receptacles and switches from a remote source, such as a computer or a microcontroller as well as for means for determining whether a remote electrical appliance, such as a lamp, is on or off, and providing such information back to the computer or microcontroller. For example, remote control of a switch or receptacle can permit lights to be turned on or off in a programmed sequence. By use of remote control, the power available at a receptacle may be varied so that a lamp plugged into the receptacle may be dimmed from a remote source.

There are many uses for remotely controlled devices in the area of energy conservation. For example, by monitoring exhaust fans in a building to determine which fans are running, a computer can control the fan based upon the time of day or other information so that the fan does not run in an unoccupied building.

Conventionally, remote control of receptacles and switches has been accomplished by the use of radio or infra-red frequencies to pass information to and from electrical devices, such as receptacles or switches. The controlled device is manufactured with electronic components contained within the device. There are limitations to this type of device. Interference from other radio systems may cause devices to switch on or off unpredictably. Interference from neighboring electrical devices may cause unpredictable results. Infra-red requires a "line of sight" to the device and is therefore also limited.

Another system for remote control of electrical devices uses the AC power lines as a carrier and superimposes a controlling signal at a high frequency. This method also has limitations. For example, when lamps are switched on, this system may not be able to switch them off because the temperature change at the lamp may cause interference. Further, there are problems in trying to control fluorescent lamps with this system and discharge lamps or halogen lamps cannot be controlled.

The control systems discussed above all use manufactured modules providing an electrical receptacle into which the controlled device is plugged, the module in most cases plugged into an existing receptacle to receive power. These remotely controlled devices are surface mounted and may be unattractive to look at, expensive, and are provided in limited styles and colors, which may not match the decor of their surroundings.

It is desirable to provide a controlling system that makes use of existing receptacles and switches and which can control such devices while they are mounted within an electrical box in the normal manner with a cover plate flush with the surrounding wall surface. The installation would then appear to be an uncontrolled outlet or switch, but would be a safer installation as the controlled device could be switched off completely to provide child safety.

For many years there have been reliable systems for providing control of electrical devices by use of low voltage wiring and electronic control devices. When wiring is used to provide control there is less likelihood of interference and most if not all of the limitations of other systems discussed above are overcome. However, since electronic control devices operate at lower voltages than electrical devices such as receptacles, consideration must be given to several parts of electrical codes in existence in many countries which require:

1. When wiring from two systems having different voltages are present in an enclosure, these wires should be physically separate.
2. Wiring must be protected against mechanical damage.
3. Adequate space must be provided in a box which contains an electrical device.
4. A semiconductor device should not be relied upon as a disconnecting means.
5. Terminations for wiring of both systems must be accessible.

Disclosed in the prior technical literature are a number of enclosures for electrical and control devices. For example, Tashjian, U.S. Pat. No. 1,437,324 (Nov. 28, 1922) discloses a combined conduit, junction box and outlet box with a removable facepiece. The conduit/box is divided into high and low voltage portion by a permanent divider. No means for connecting a device in one portion with a device in the other portion is provided. Both portions are accessible when the facepiece is removed.

Haering, U.S. Pat. No. 1,829,648 (Oct. 27, 1931) discloses an electric receptacle baffle for dividing an electrical box into high and low voltage portions. No means for connecting a device in one portion with a device in the other portion is provided and both portions are accessible when the cover plate is removed.

Ohmit, U.S. Pat. No. 3,082,290 (Mar. 19, 1963) discloses a moveable floor-to-ceiling electrical installation for interior of a building comprised of a divided vertical conduit and a divided box joined to the conduit. The conduit and box are divided into high and low voltage portions. Again, no means are provided for connecting a device in one portion with a device in the other portion.

Ceglia, U.S. Pat. No. 3,146,298 (Aug. 25, 1964) discloses an electrical distribution system. Electrical boxes and a bus duct are provided with means for routing wiring from the bus duct to the boxes.

Fork, U.S. Pat. No. 3,701,837 (Oct. 31, 1972) discloses a multiple electrical service underfloor access housing. The housing is divided into portions for high and low voltage wiring with no means for interconnection.

Fork, et al., U.S. Pat. No. 4,323,723 (Apr. 6, 1982) discloses a surface mounted outlet unit with separate compartments with no means for interconnection between compartments.

Bantz et al., U.S. Pat. No. 5,257,487 (Nov. 2, 1993) discloses a floor box for in-floor activations in a concrete floor divided into separate compartments by a partition with no means for interconnection between compartments.

Nattel et al., U.S. Pat. No. 5,354,953 (Oct. 11, 1994) discloses a cable holding device for holding a telephone cable beside an electrical outlet box so that a modular telephone jack can be mount to a faceplate shared with an outlet in the electrical box, but the telephone cable and jack do not enter the electrical box. Again, there is no connection between the inside of the electrical box and the outside space in which the telephone jack is located.

Yetter, U.S. Pat. No. 5,486,650 (Jan. 23, 1996) discloses a partition for dividing a device box. Again, no means are provided for connecting a device in one compartment of the box with a device in the other compartment.

Cottone, U.S. Pat. No. 5,574,256 (Nov. 12, 1996) discloses a recessed transformer electrical outlet box with integral telephone line connection. A cover plate having a modular telephone jack is provided to cover the recessed electrical outlet, the idea being to hide a line voltage adaptor module associated with a cordless telephone base station. No means are provided for connecting the high voltage wiring in the inner compartment of the box with a low voltage device in the outer compartment.

Fabian et al., U.S. Pat. No. 5,594,207 (Jan. 14, 1997) discloses a self-locking divider plate for dividing an electrical box into physically isolated compartments. No means are provided for connecting high voltage wiring in one compartment of the box with a low voltage device in the other compartment, other than possibly the openings 17c and 17d. Please consider whether these openings could be used to interface a low voltage control circuit with a high voltage controlled circuit.

Lynn, U.S. Pat. No. 5,598,998 (Feb. 4, 1997) discloses an electrical outlet box mounting bracket. The idea is a variant of the Nattel et al. device discussed above.

There is a need, not satisfied by known combined enclosures for electrical and electronic control devices, for a simple, inexpensive, easy to install enclosure for electrical and electronic control devices that can be flush mounted in a wall and which complies with the requirements of electrical codes.

SUMMARY OF THE INVENTION

The present invention is directed in one aspect to providing a combined enclosure for electrical and control devices so that the high voltage electrical device is separated by a barrier from the low voltage device and so that the electrical device cannot be installed unless the barrier is installed.

In another aspect the present invention is directed to providing a combined enclosure for an electrical device and a control device for controlling the electrical device, the electrical device of the type having two spaced apertures for screws for mounting the electrical device in an electrical power outlet box having two spaced holes for securing the screws and the control device having both controlled connectors and controlling connectors. The combined enclosure comprises an electrical device enclosure, a control components enclosure, and dividing plate. The electrical device enclosure is comprised of a top, a bottom, two sides, and a back and defining a rectangular front opening, an opening in the bottom defining two side ledges, and the top having a first mounting tab adjacent to the front opening, the first mounting tab having a hole for securing a screw for mounting the electrical device in the electrical device enclosure. The control components enclosure comprises a bottom wall, a front wall, a back wall, and two side walls and defining a rectangular top opening, the side walls bent over to form flanges along each side of the top opening, the outside dimensions of the control components enclosure selected to allow the control components enclosure to be moved through the front opening of the electrical device enclosure and bottom wall first down through the opening in the bottom of the electrical device enclosure with minimal clearance so as to hang by the flanges from the side ledges. The dividing plate for completing the electrical device enclosure comprises an underside for installation flat against the bottom of the electrical device enclosure and provides a second mounting tab having a hole for securing a screw for mounting the electrical device to the plate so that the electrical device may not be mounted in the combined enclosure unless the plate is installed, a mating interference element for securing the plate against movement relative to the electrical device enclosure when the divider is placed against the bottom of the electrical device enclosure and an electrical device is mounted to the mounting tabs, an aperture in the plate for mounting the control device so that when the control device is mounted to the underside of the divider plate the controlled connectors are accessible from the upper side of the divider and the controlling connectors are accessible from the underside of the divider plate.

In another aspect the present invention is directed to providing an enclosure for an electrical device and a control device for controlling the electrical device, the control device having both controlled connectors and controlling connectors. The enclosure comprises a body having an access opening for mounting the devices inside the combined enclosure and a first location adjacent the access opening for attachment of the electrical device to the body. The combined enclosure further comprises a removable divider installable within the body so as to divide the interior of the body into an electrical device compartment accessible from the access opening and a control device compartment. The divider has a second location for attachment of the electrical device to the body so that the electrical device may not be mounted in the combined enclosure unless the divider is installed. The divider is also provided with attachment elements for attaching the control device to the divider so that the controlled connections are accessible for connection to the electrical device while the controlling connections are accessible for connection in the control compartment.

In another aspect the present invention is directed to providing an enclosure for an industry standard electrical device and a control device for controlling the electrical device, the control device having both controlled connectors and controlling connectors. The combined enclosure comprises a body having a front opening for mounting the electrical device inside the body and one mounting element for attachment of the electrical device. A removable divider installable within the enclosure is provided so as to divide the interior of the body into a compartment to accommodate the mounted electrical device and a compartment to accommodate the control device. The divider has a second mounting element for attachment of the electrical device so that the electrical device may not be mounted in the body unless the divider is installed. The divider has attachment elements for attaching the control device to the divider so that the controlled connections are accessible for connection to the electrical device while the controlling connections are accessible for connection in the control compartment.

In yet another aspect the present invention is directed to providing an enclosure for enclosing industry standard electrical devices and mounting low voltage devices. The enclosure comprises a box having a front opening and an insufficient number of mountings to mount an industry standard electrical device in the front opening. Also provided is a divider that when installed in the box provides the enclosure with a sufficient number of mountings to mount the electrical device, the divider providing mountings for a low voltage device to allow a low voltage device to be mounted to the enclosure so that all electrical connections to the low voltage device are accessible when the divider is removed and all low voltage wiring and low voltage connections to the low voltage device are outside the box.

In yet another aspect the present invention is directed to providing a box adapted for forming in combination with a divider an enclosure for enclosing industry standard electrical devices and mounting low voltage devices, the box having a front opening and an insufficient number of mountings to mount an industry standard electrical device in the front opening and adapted for receiving a divider that when installed in the box provides the enclosure with a sufficient number of mountings to mount the electrical device, the divider providing mountings for a low voltage device to allow a low voltage device to be mounted to the enclosure so that all electrical connections to the low voltage device are accessible when the divider is removed and all low voltage wiring and low voltage connections to the low voltage device are outside the box.

In yet another aspect the present invention is directed to providing a box adapted for mounting a low voltage device, the box forming in combination with the low voltage device an enclosure for enclosing an industry standard electrical device. The box has a front opening and an insufficient number of mountings to mount an industry standard electrical device in the front opening unless the low voltage device is first mounted to the box so that all electrical connections to the low voltage device are accessible when the electrical device is removed and all low voltage wiring and low voltage connections to the low voltage device are outside the box.

In yet another aspect the present invention is directed to providing a divider adapted for installation in a box having a front opening and an insufficient number of mountings to mount an industry standard electrical device in the front opening so as to form an enclosure for enclosing industry standard electrical devices and mounting low voltage devices. When the divider is installed in the box the enclosure is provided with a sufficient number of mountings to mount the electrical device, the divider providing mountings for a low voltage device to be mounted to the enclosure so that all electrical connections to the low voltage device are accessible when the divider is removed and all low voltage wiring and low voltage connections to the low voltage device are outside the box.

DETAILED DESCRIPTION OF THE PREFERRED EMBODIMENT

Figure 1:
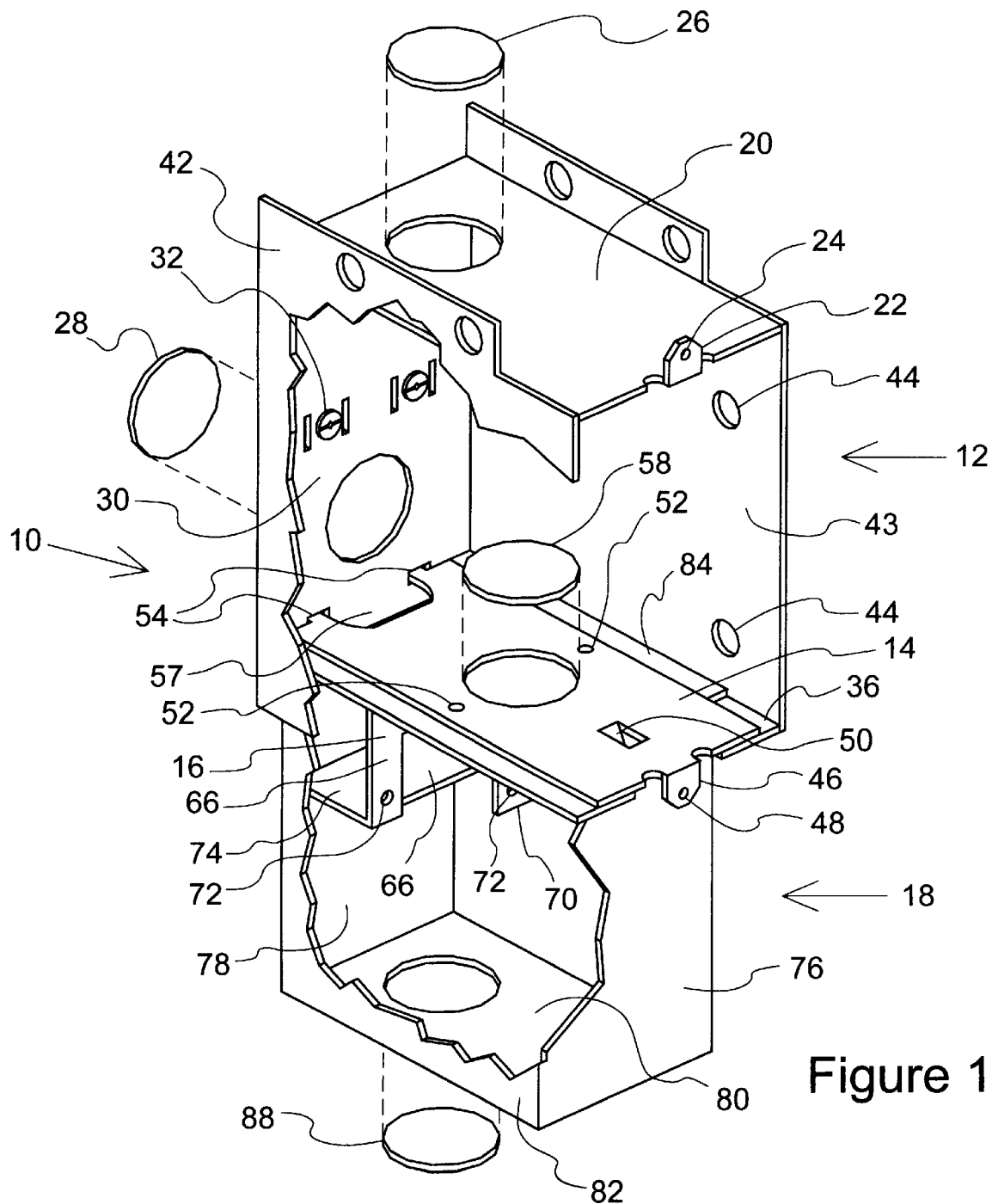
FIG. 1 is a schematic isometric view of a combined enclosure for electrical and control devices in accordance with the present invention with a portion of a side exterior wall of the enclosure cut away.
Figure 2:
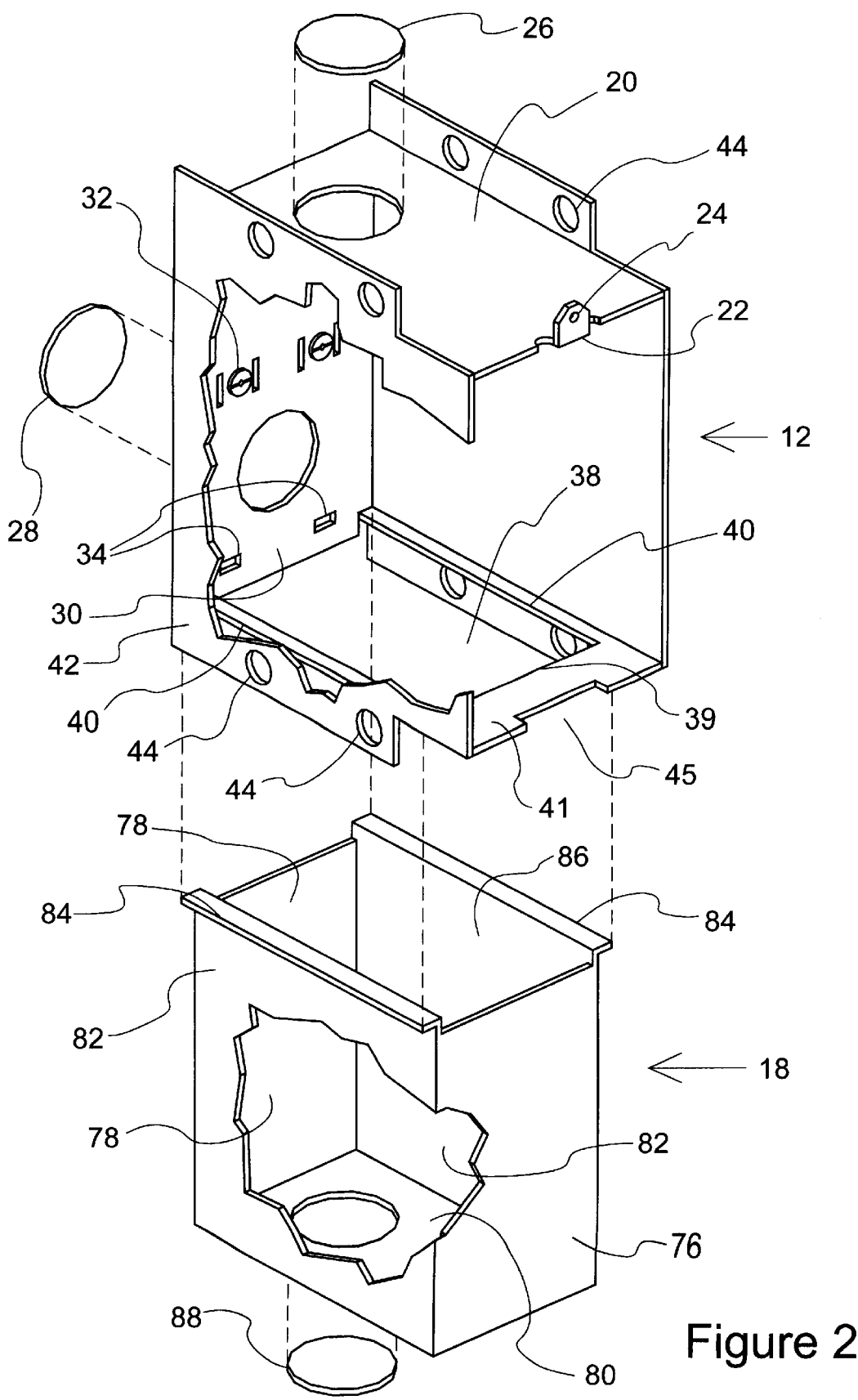
FIG. 2 is an exploded schematic isometric view of the combined enclosure of FIG. 1 with the dividing and offset plates removed.
Figure 3:
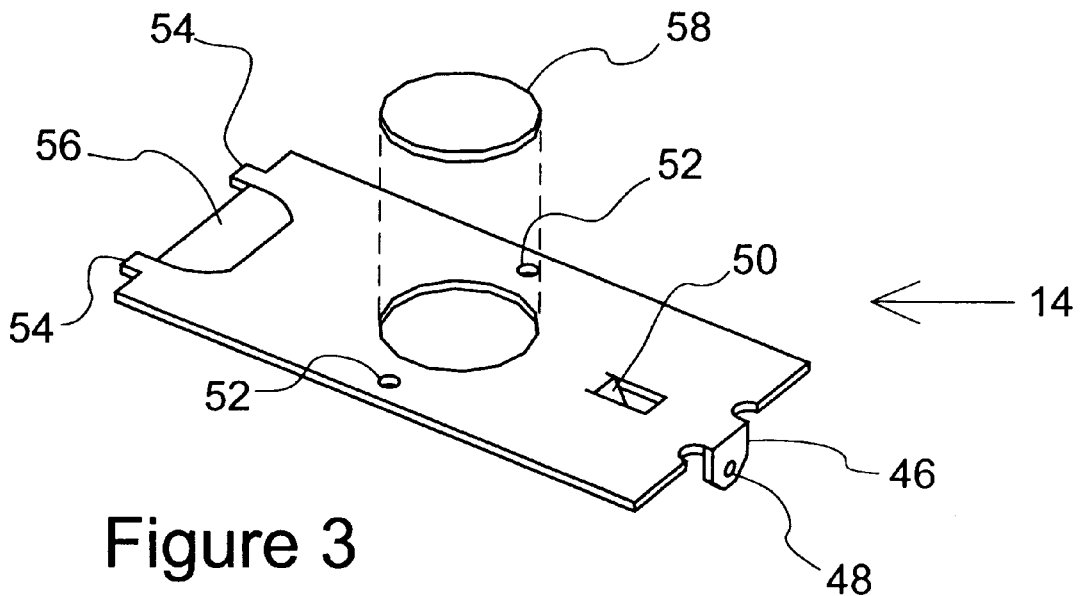
FIG. 3 is a schematic isometric view of the dividing plate of the combined enclosure of FIG. 1.
Figure 4:
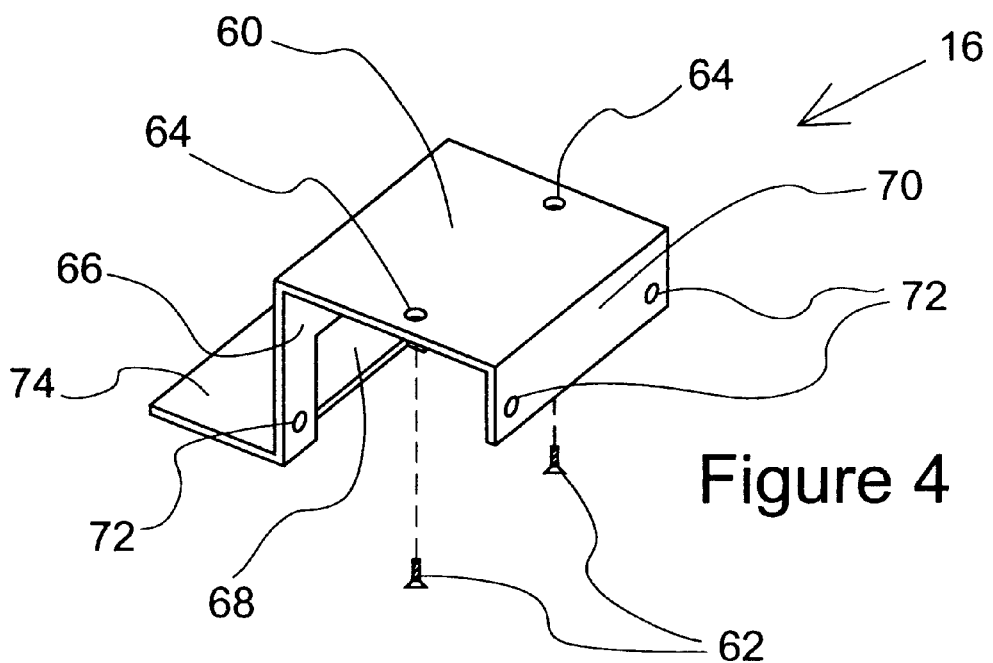
FIG. 4 is a schematic isometric view of the offset plate of the combined enclosure of FIG. 1.

FIG. 1 shows a preferred embodiment of a combined enclosure for electrical (also referred to herein as high voltage, typically line voltage or higher) devices and control or other low voltage devices in accordance with the present invention, the combined enclosure generally indicated by numeral 10. FIGS. 2, 3, and 4, show separately the main constituent elements of the combined enclosure 10, namely, an electrical device enclosure 12, a dividing plate 14, an offset plate 16, and a control device enclosure 18. Although other suitable material such as plastic could be used, the electrical device enclosure 12, dividing plate, and offset plate are preferably of cold rolled steel plate having a thickness of approximately 1/16" and the control device enclosure 18 is preferably of cold rolled steel plate having a thickness of approximately 1/20".

As illustrated in FIG. 2, the electrical device enclosure 12 generally resembles known rectangular electrical boxes of the kind commonly used to install lights switches and outlets. The electrical device enclosure 12 comprises a top wall 20, a back wall 30, a bottom wall 36, and side walls 42, the front edges of the top, bottom, and side wall defining a front opening 43. The top wall 20, back wall 30, and bottom wall 36 are formed in a conventional manner by bending a single metal sheet after the openings and cutouts described below have been made. The side walls 42 are generally flat metal sheets and are attached in the conventional manner to the top wall 20, back wall 30, and bottom wall 36. The front edge of the top wall 20 is provided with an upturned mounting tab 22 with a hole 24 for receiving a screw (not shown) for mounting an electrical device to the electrical device enclosure 12. The top wall 20 is also provided with a circular knockout 26 for selectively punching out to receive electrical cable or conduit. Conventional means, such as a pry-outs and cable clamps (not shown) may be provided as well. The back wall 30 is provided with tapped holes (not shown) for grounding screws 32 and two slots 34, each having a height slightly greater than the thickness of the dividing plate 14, and a circular knockout 28 for selectively punching out to receive electrical cable or conduit. The bottom wall 36 has a large rectangular opening 38 with a front edge 39. Surrounding the opening 38 are ledges 40 abutting the side walls 42 and a front frame portion 41 between the opening 38 and the front edge of the bottom wall 36. A portion of the front of front frame portion 41 is removed to provide a notch 45. Each side wall 42 is provided with openings 44 to receive means, such as screws (not shown), for mounting the combined enclosure 10.

The dividing plate 14, which is shown in FIG. 3 separately from the assembled combined enclosure of FIG. 1, is provided with a down turned mounting tab 46 having a hole 48 for receiving a screw (not shown) for mounting an electrical device (not shown) in conjunction with mounting tab 22 in the electrical device enclosure 12, a tang 50, tapped holes 52 for attaching the offset plate 16, and a circular knockout 58. The dividing plate 14 as shown in FIG. 3 has tabs 54 and a partially sheared tab 56. The partially sheared tab 56 may be removed as shown in FIG. 1 to provide an opening 57 between the electrical device enclosure 12 and the control device enclosure 18 in the assembled combined enclosure 10, but may in some applications tab 56 be left in place if the circular knockout 58 is removed to provide means to connect devices in the electrical device enclosure 12 to devices in the control device enclosure 18.

The offset plate 16, which is shown in FIG. 4 separately from the assembled combined enclosure 10 of FIG. 1, is folded from a rectangular sheet of metal into four sections; an attachment section 60, an aperture section 66, a control device mounting section 70, and a barrier section 74. The offset plate attachment section 60 is provided with openings 64 for offset plate attachment screws 62. Screws 62 are used to attach the offset plate 16 to the underside of the dividing plate 14 using the tapped holes 52. An aperture 68 and tapped control device mounting holes 72 are provided in the aperture section 66.

The control device enclosure 18 is an open-topped box having a front wall 76, back wall 78, bottom wall 80, side walls 82, and an open top 86. The upper edges of the side walls 82 are turned-out to provide flanges 84 approximately equal in size to the ledges 40. The control device enclosure 18 is smaller in its outside dimensions that the inside dimensions of the electrical device enclosure 12 and has a rectangular horizontal outside cross-section closely matching that of the rectangular opening 38 so that the control device enclosure 18 may be slid into the rectangular opening 38 with minimal clearance. Circular knockouts 88 may also be provided in the walls 76, 78, 80, 82.

As will be apparent from the description above the combined enclosure 10 may be assembled by sliding the control device enclosure 18 into the rectangular opening 38 of the electrical device enclosure 12 until the flanges 84 rest upon the ledges 40. The dividing plate 12 with the offset plate 14 attached is then moved into the interior of the electrical device enclosure 12 so that the tabs 54 enter the slots 34. The dividing plate 14 is then pushed downward so that the dividing plate 14 rests on the front frame portion 41 and the tang 50 enters the opening 38 and contacts the front edge 39 of the opening 38 to lock the dividing plate 14 in place against front-to-back movement. The mounting tab 46 is accommodated by the notch 45 so that the front edge of the dividing plate 12 is flush with the front edges of the side walls 42 and the top wall 20 which front edges define the front opening 43. Further, when an electrical device (not shown) is installed in the electrical device enclosure 12 using the mounting tabs 22 and 46, the electrical device itself bridges between the mounting tabs 22, 46 locking the dividing plate 14 in place against vertical movement. The assembled combined enclosure is shown in FIGS. 5 and 6, the electrical device enclosure 12 providing mounting and cabling provisions for an electrical device equivalent to those of a conventional rectangular box.

Figure 5:
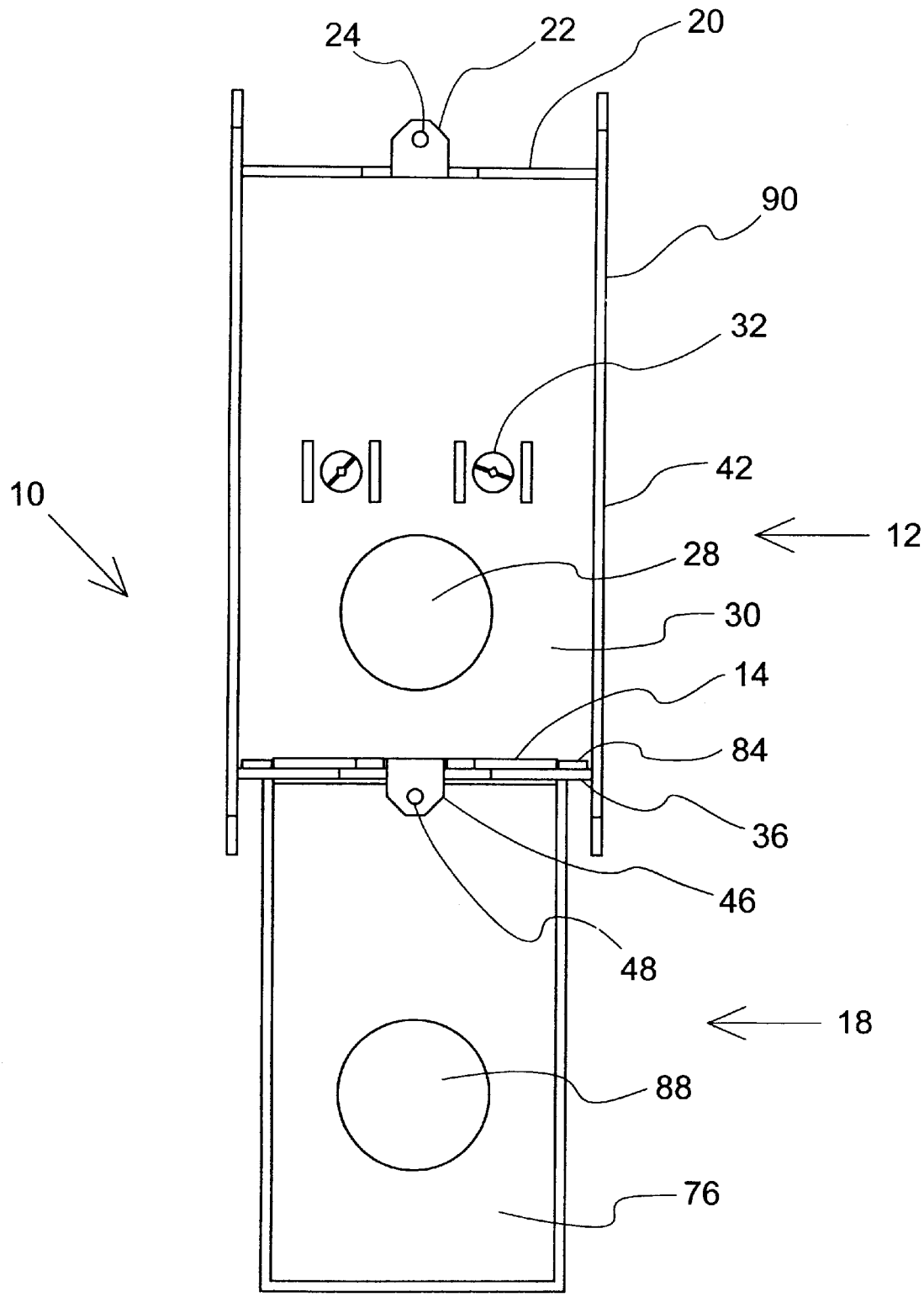
FIG. 5 is a schematic front elevation view of the combined enclosure of FIG. 1.
Figure 6:
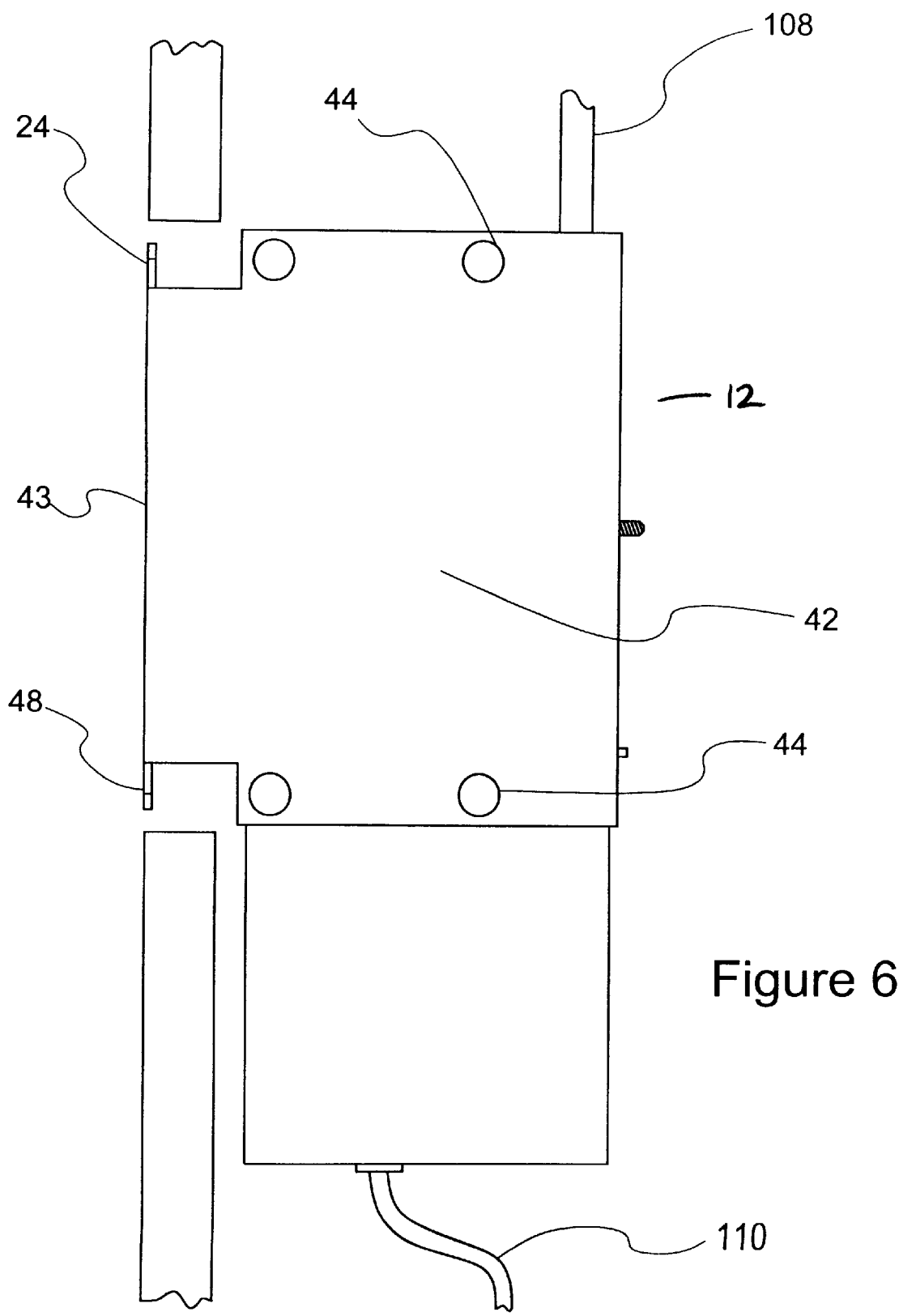
FIG. 6 is a schematic side elevation view of the combined enclosure of FIG. 1.

Because the mounting tab 46 is part of the dividing plate 14, an electrical device cannot be mounted to mounting tabs 22, 46 unless the dividing plate 14 is in place as shown in FIGS. 1 and 5, discouraging an installer from installing both control and electrical devices in the combined enclosure 10 without providing the dividing plate 14 as a physical barrier as required by electrical codes.

Figure 7:
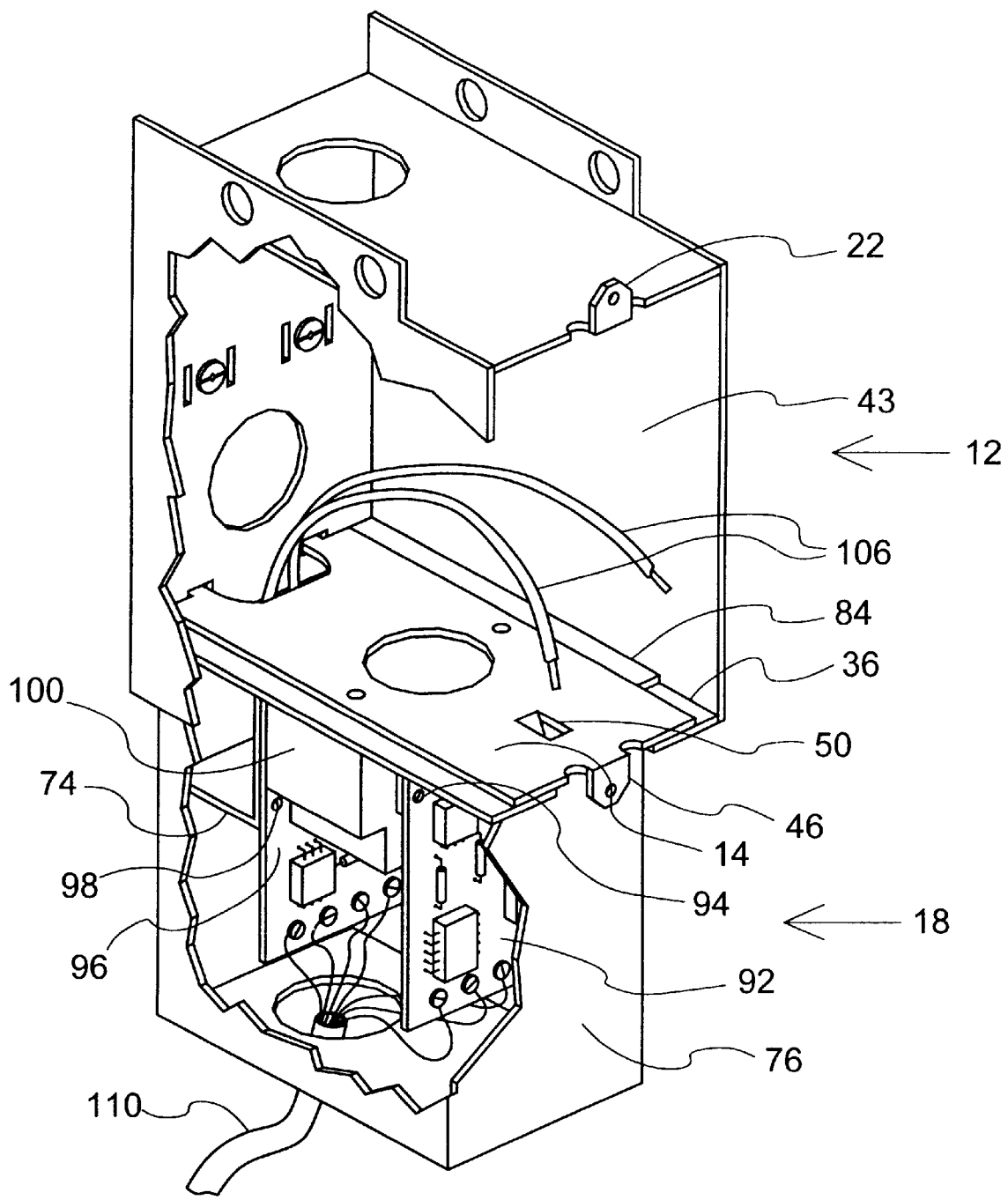
FIG. 7 is a schematic isometric view of the combined enclosure of FIG. 1 with a portion of a side exterior wall of the enclosure cut away to show control components installed is therein.
Figure 8:
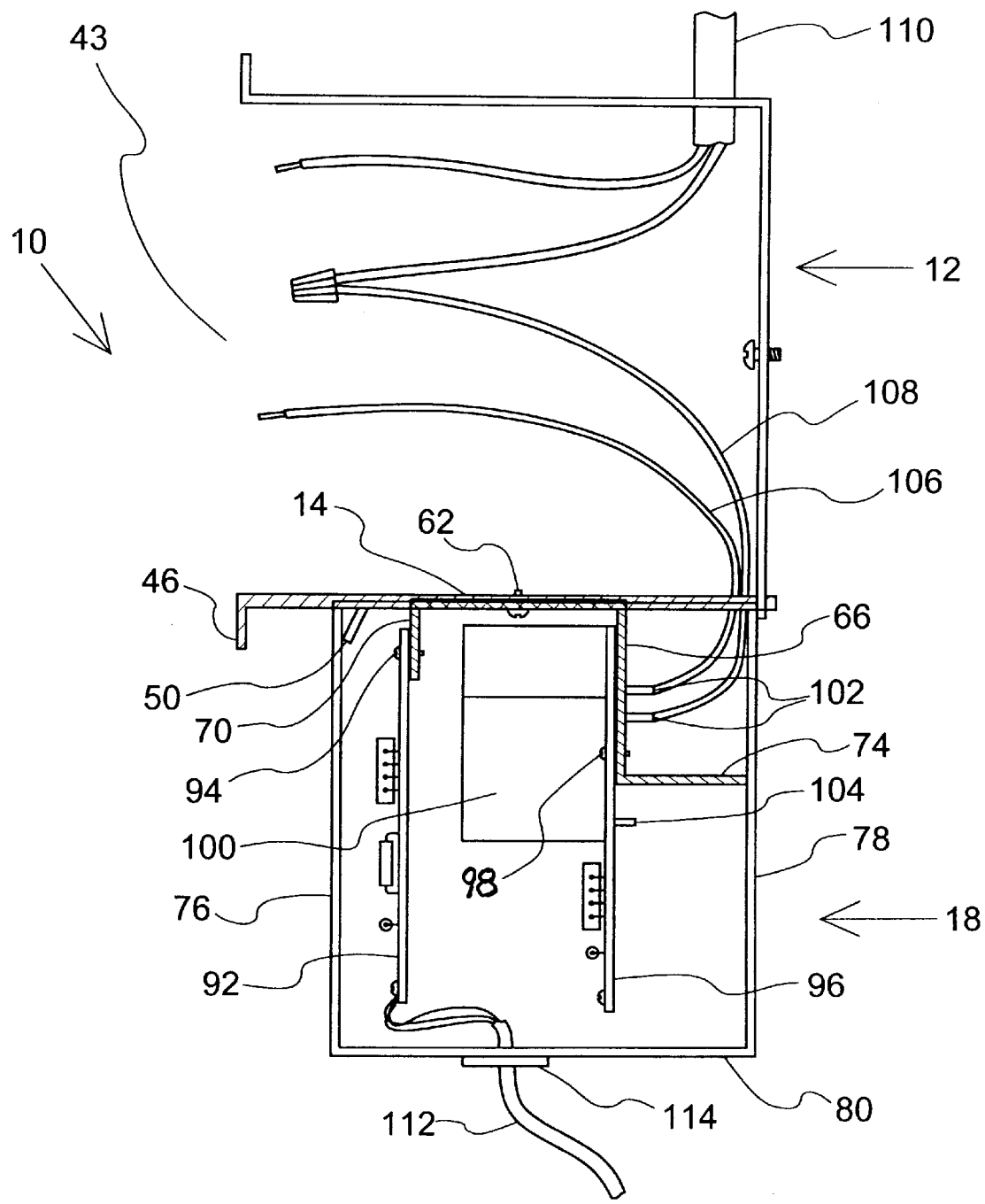
FIG. 8 is a schematic side elevation view showing control components mounted in the combined enclosure of FIG. 1, which is in cross-section.

FIGS. 7 and 8 illustrate a typical installation of a control device comprised of a relay and two circuit boards in the combined enclosure 10. One circuit board 92 is mounted with screws 94 to the control device mounting section 70 and a second circuit board 96 is mounted to the aperture section 66 with screws 98. In each case the screws 94, 98 are received by tapped control device mounting holes 72. A relay 100 of the Omron G8P series is shown mounted to the second circuit board 96 so that aperture 68 is covered by the relay 100 and the controlled connection pins 102 of the relay 100 pass through aperture 66, while the controlling connection pins 104 of the relay 100 are connected to the circuit board 96 inside the control device enclosure 18. Wires 106 and 108, connected to the controlled connection pins 102, pass through the opening 57 in the barrier plate 14 into the electrical device enclosure 12. Wires 106 and 108 are then connected in series with a controlled electrical device (not shown), such as an outlet, to an electrical power cable 110, which also enters the electrical device enclosure 12. A control signal cable 112, connected to the circuit boards 92, 96, enters the control device enclosure 18 through an aperture 114 formed in the bottom wall 80 by the removal of the circular knockout 88.

Figure 9:
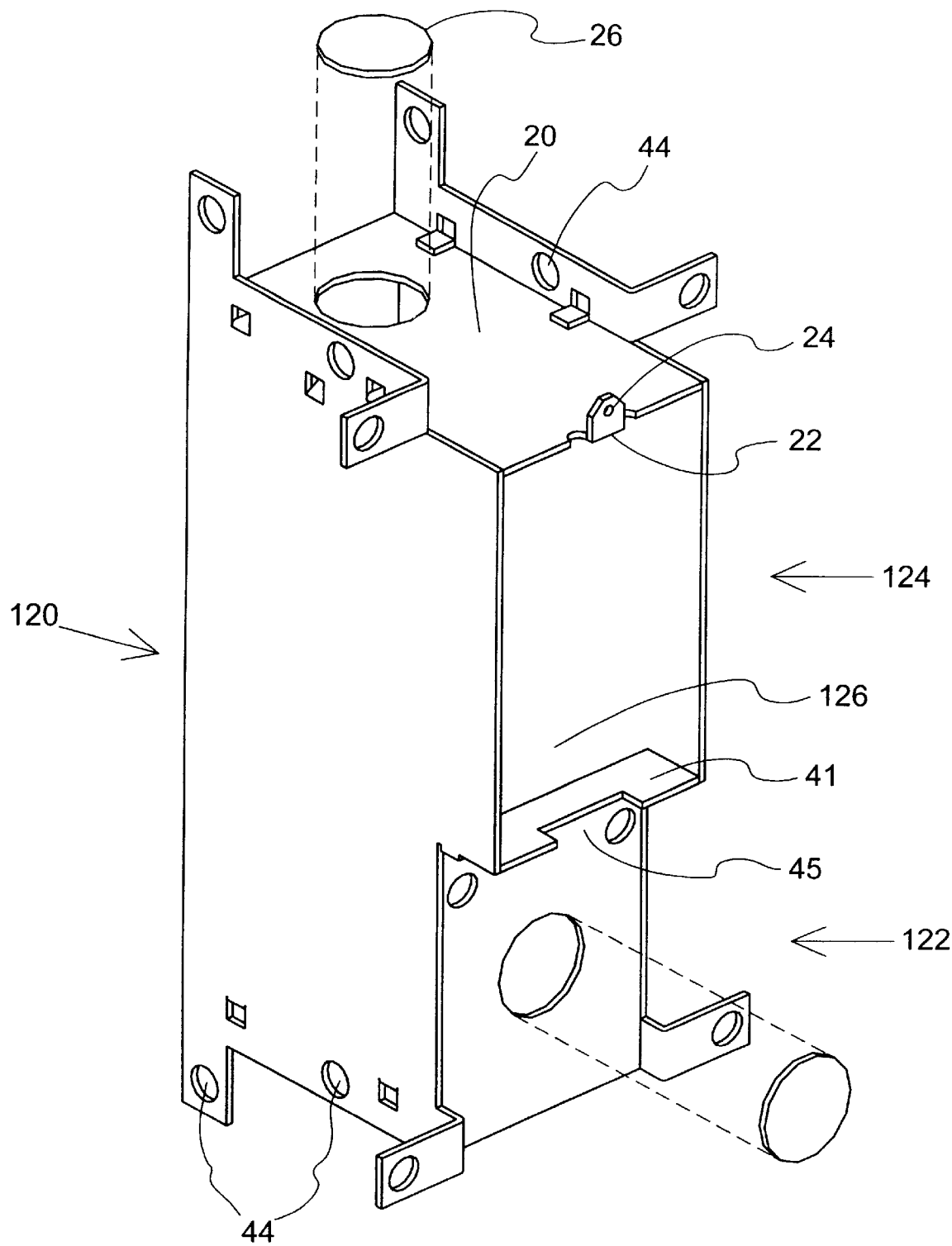
FIG. 9 is a schematic isometric view of a combined enclosure for electrical and control devices in accordance with the present invention with the dividing plate removed.

FIG. 9 illustrates a variant embodiment of the invention suitable for new construction in which the electrical device enclosure 12 and the control device enclosure 18 of the embodiment shown in FIGS. 1–8 are combined in a unitary enclosure 120. Unitary enclosure 120 accepts divider plate 14 and offset plate 16 in the same manner as electrical device enclosure 12 as described above, the divider plate 14 partitioning the unitary enclosure 120 into a control device enclosing portion 122 and an electrical device enclosing portion 124. The ledges 40 of the embodiment shown in FIGS. 1–8 are not necessary so that the unitary enclosure 120 provides a wider opening 126 for the installation of control devices in the lower portion.

Other modifications will be apparent to those skilled in the art and, therefore, the invention is defined in the claims.

What is claimed is:

1. A combined enclosure for an electrical device and a control device for controlling the electrical device, the electrical device of the type having two spaced apertures for screws for mounting the electrical device in an electrical power outlet box having two spaced holes for securing the screws and the control device having both controlled connectors and controlling connectors, the combined enclosure comprising:

an electrical device enclosure comprised of a top, a bottom, two sides, and a back and defining a rectangular front opening, an opening in the bottom defining two side ledges, and the top having a first mounting tab adjacent to the front opening, the first mounting tab having a hole for securing a screw for mounting the electrical device in the electrical device enclosure;

a control components enclosure having a bottom wall, a front wall, a back wall, and two side walls and defining a rectangular top opening, the side walls bent over to form flanges along each side of the top opening, the outside dimensions of the control components enclosure selected to allow the control components enclosure to be moved through the front opening of the electrical device enclosure and bottom wall first down through the opening in the bottom of the electrical device enclosure with minimal clearance so as to hang by the flanges from the side ledges;

a dividing plate for completing the electrical device enclosure, the plate having an underside for installation flat against the bottom of the electrical device enclosure and providing a second mounting tab having a hole for securing a screw for mounting the electrical device to the plate so that the electrical device may not be mounted in the combined enclosure unless the plate is installed, a mating interference element for securing the plate against movement relative to the electrical device enclosure when the divider is placed against the bottom of the electrical device enclosure and an electrical device is mounted to the mounting tabs; and an aperture in the plate for mounting the control device so that when the control device is mounted to the underside of the divider plate the controlled connectors are accessible from the upper side of the divider and the controlling connectors are accessible from the underside of the divider plate.

2. An enclosure for an electrical device and a control device for controlling the electrical device, the control device having both controlled connectors and controlling connectors, the enclosure comprising:

a body having an access opening for mounting the devices inside the enclosure and a first location adjacent the access opening for attachment of the electrical device to the body; and a removable divider installable within the body so as to divide the interior of the body into an electrical device compartment accessible from the access opening and a control device compartment, the divider having a second location for attachment of the electrical device to the enclosure, so that the electrical device may not be mounted in the enclosure unless the divider is installed, and attachment elements for attaching the control device to the divider so that the controlled connectors are accessible for connection to the electrical device while the controlling connectors are accessible for connection in the control compartment.

3. An enclosure for an electrical device and a control device for controlling the electrical device, the control device having both controlled connectors and controlling connectors, the enclosure comprising:

a body having a front opening for mounting the electrical device inside the body and one mounting element for attachment of the electrical device; and a removable divider installable within the body so as to divide the interior of the body into a compartment to accommodate the mounted electrical device and a compartment to accommodate the control device, the divider having a second mounting element for attachment of the electrical device so that the electrical device may not be mounted in the body unless the divider is installed, the divider further having attachment elements for attaching the control device to the divider so that the controlled connectors are accessible for connection to the electrical device while the controlling connectors are accessible for connection in the control compartment.

4. An enclosure for enclosing electrical devices and mounting low voltage devices, the enclosure comprising:

a box having a front opening and an insufficient number of mountings to mount an electrical device in the front opening; and a divider that when installed in the box provides the enclosure with a sufficient number of mountings to mount the electrical device, the divider providing mountings for a low voltage device to allow a low voltage device to be mounted to the enclosure so that all electrical connections to the low voltage device are accessible when the divider is removed and all low voltage wiring and low voltage connections to the low voltage device are outside the box.

5. A box adapted for forming in combination with a divider an enclosure for enclosing electrical devices and mounting low voltage devices, the box having a front opening and an insufficient number of mounting elements to mount an electrical device within the front opening and adapted for receiving a divider that when installed in the box provides the enclosure with a sufficient number of mounting elements to mount the electrical device, the divider providing mountings for a low voltage device to allow a low voltage device to be mounted to the enclosure so that all electrical connections to the low voltage device are accessible when the divider is removed and all low voltage wiring and low voltage connections to the low voltage device are outside the box.

6. A box adapted for mounting a low voltage device, the box forming in combination with the low voltage device an enclosure for enclosing an electrical device, the box having a front opening and an insufficient number of mounting elements to mount an electrical device within the front opening unless the low voltage device is first mounted to the box so that all electrical connections to the low voltage device are accessible when the electrical device is removed and all low voltage wiring and low voltage connections to the low voltage device are outside the box.

7. A divider adapted for installation in a box having a front opening and an insufficient number of mountings to mount an electrical device within the front opening so as to form an enclosure for enclosing electrical devices and mounting low voltage devices, the divider when installed in the box providing the enclosure with a sufficient number of mounting elements to mount the electrical device, the divider providing mounting elements for a low voltage device to be mounted to the enclosure so that all electrical connections to the low voltage device are accessible when the divider is removed and all low voltage wiring and low voltage connections to the low voltage device are outside the box.

8. An enclosure for enclosing an electrical device and mounting a control device comprising an electrical device enclosure having an electrical device mounting location and a control device mounting plate having a control device mounting location, the electrical device not fully mountable within the electrical device enclosure unless the control device mounting plate is first installed in the electrical device enclosure and the control device mounting plate when installed separating the electrical device mounting location from the control device mounting location.

* * * * *